(12) United States Patent
Geurts et al.

(10) Patent No.: US 8,870,276 B2
(45) Date of Patent: Oct. 28, 2014

(54) LOCKING MECHANISM FOR OPEN ROOF CONSTRUCTION AND OPEN ROOF CONSTRUCTION PROVIDED THEREWITH

(71) Applicant: Inalfa Roof Systems Group B.V., Venray (NL)

(72) Inventors: Ruud Geurts, Helden (NL); Marcel Johan Christiaan Nellen, Merselo (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/723,693

(22) Filed: Dec. 21, 2012

(65) Prior Publication Data
US 2013/0161983 A1    Jun. 27, 2013

(30) Foreign Application Priority Data

Dec. 22, 2011   (EP) ..................................... 11195333

(51) Int. Cl.
*B60J 7/00*   (2006.01)
*B60J 7/185*  (2006.01)

(52) U.S. Cl.
CPC ....................................... *B60J 7/185* (2013.01)
USPC ..................................... 296/224; 296/216.03

(58) Field of Classification Search
USPC ................................ 296/224, 216.03, 216.05
See application file for complete search history.

(56) References Cited

U.S. PATENT DOCUMENTS

| | | | | |
|---|---|---|---|---|
| 4,877,285 A | * | 10/1989 | Huyer | .................... 296/216.03 |
| 4,911,497 A | | 3/1990 | Schreiter | |
| 5,746,475 A | * | 5/1998 | Caye et al. | .................... 296/223 |
| 5,765,908 A | * | 6/1998 | Kelm | .......................... 296/223 |
| 5,971,473 A | * | 10/1999 | Kelm | .......................... 296/223 |
| 6,012,768 A | * | 1/2000 | Nabuurs et al. | .......... 296/216.03 |
| 6,129,413 A | | 10/2000 | Klein | |
| 6,199,944 B1 | * | 3/2001 | Lee et al. | ...................... 296/224 |
| 6,390,545 B1 | | 5/2002 | Makino et al. | |

(Continued)

FOREIGN PATENT DOCUMENTS

| | | |
|---|---|---|
| DE | 19851366 | 5/1999 |
| EP | 0331910 | 9/1989 |

(Continued)

OTHER PUBLICATIONS

Official Search Report of the European Patent Office in counterpart foreign application No. EP 11195333 filed Dec. 22, 2011.

*Primary Examiner* — Dennis H Pedder
(74) *Attorney, Agent, or Firm* — Steven M. Koehler; Westman, Champlin & Koehler, P.A.

(57) ABSTRACT

A locking mechanism for a movable member of an open roof construction for a vehicle comprises a stationary part having a first guide, a locking lever movable in a first direction drives said movable member and locks and an operating part movable in said first direction to control the locking lever. The locking lever comprises a first cam engaging the first guide comprising a first guide part extending substantially parallel to said first direction and a second guide part connecting to said first guide part in a second direction and capable of receiving the first cam of the locking lever to prevent movement of the locking lever. The operating part generates a force on the locking lever in/opposite the second direction when the operating part is moved in a first/second sense along said first direction, such that the first cam moves into/out of the locking second guide part.

20 Claims, 7 Drawing Sheets

(56) References Cited

U.S. PATENT DOCUMENTS

| | | | |
|---|---|---|---|
| 6,454,347 B2 * | 9/2002 | Lee et al. | 296/223 |
| 6,527,337 B2 | 3/2003 | Farber | |
| 7,850,231 B2 * | 12/2010 | Ito et al. | 296/220.01 |
| 8,136,872 B2 | 3/2012 | Nellen | |
| 2005/0218704 A1 | 10/2005 | Uehara | |
| 2009/0039682 A1 | 2/2009 | Ito | |
| 2009/0072589 A1 | 3/2009 | Ito | |

FOREIGN PATENT DOCUMENTS

| | | |
|---|---|---|
| EP | 1741588 | 1/2007 |
| EP | 2028031 | 2/2009 |
| JP | 59156820 | 9/1984 |
| WO | WO 2009109219 | 9/2009 |

* cited by examiner

LOCKING MECHANISM FOR OPEN ROOF CONSTRUCTION AND OPEN ROOF CONSTRUCTION PROVIDED THEREWITH

BACKGROUND

The discussion below is merely provided for general background information and is not intended to be used as an aid in determining the scope of the claimed subject matter.

Aspects of the invention relate to a locking mechanism for a movable member of an open roof construction for a vehicle.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

According to an aspect of the present invention, the locking mechanism comprises a stationary part which is provided with a first guide, a locking lever movable in a first direction for driving said movable member and for locking it in a predetermined position and an operating part movable in said first direction for controlling the movement of the locking lever, wherein the locking lever comprises a first cam cooperating with the first guide, which first guide comprises a first guide part extending in a direction substantially in parallel to said first direction of movement of the locking lever and a second guide part connecting to said first guide part in a second direction and capable of receiving the first cam of the locking lever for preventing a further movement of the locking lever in said first direction, wherein the operating part is capable of generating a force on the locking lever in/opposite the second direction when the operating part is moved in a first/second sense along said first direction, such that the first cam can move into/out of the second guide part of the first guide in said second direction.

When the operating part moves in a first sense along said first direction, it initially moves the locking lever along with it while the first cam of the locking lever moves along the first guide part of the first guide in the stationary part. This results in the locking lever driving the movable member. When the movable member has reached a desired position in which it should be locked, the first cam of the locking lever has arrived at the location where the second guide part of the first guide connects to the first guide part. As a result of the force generated by the operating part the locking lever is displaced in said second direction such that its first cam enters the second guide part. The locking lever, with its first cam being locked in the second guide part of the first guide, maintains its (locked) position (also maintaining the movable member in its present position) while the operating part is free to move along (for example for causing a desired movement of a part of the open roof construction).

Starting from such a situation in which the locking lever with its first cam is locked in the second guide part of the first guide, a movement of the operating part in the opposite sense along said first direction firstly will cause the operating part to generate a force which displaces the locking lever such in the second direction that its first cam leaves the second guide part and enters the first guide part. A further movement of the operating part then moves the locking lever along in said first direction (while the locking lever in a corresponding manner drives the movable member of the open roof construction).

Because the locking movement of the first cam into and out of the second guide part occurs in a second direction which differs from the first direction, the obtained locking function basically is independent from forces acting on, or generated by the movable member.

In one embodiment the locking lever comprises a second cam cooperating with a second guide provided in the operating part, which second guide is capable of generating said force on the locking lever in/opposite the second direction when the operating part is moved in a first/second sense along said first direction, such that the first cam can move into/out of the second guide part of the first guide in said second direction while the second cam moves out of/into the second guide of the operating part.

In this embodiment the second cam will leave the second guide when the first cam enters the second guide part of the first guide to obtain the locked position.

Starting from such a situation in which the locking lever with its first cam is locked in the second guide part of the first guide, a movement of the operating part in the opposite sense along said first direction firstly will cause the second cam of the locking lever to again enter the second guide of the operating part. As a result said force is generated which displaces the locking lever such in the second direction that its first cam leaves the second guide part and enters the first guide part.

In a one embodiment of the locking mechanism the second direction is perpendicular to the first direction. This optimises the effect referred to in the previous paragraph.

Moreover it is possible that the second direction extends substantially in a horizontal plane. As a result gravity forces will have no detrimental effect on the operation of the locking mechanism.

In accordance with an aspect of the present invention the locking lever should be able to move in said second direction in such a manner that its cams can move into and out of engagement with the respective guides. Although it is conceivable that the entire locking lever is capable of such a movement, according to one embodiment of the locking mechanism the first and second cams are provided on a flexible part of the locking lever for allowing a movement in said second direction, whereas the remainder of the locking lever is designed to move in said first direction only. The advantage of such an embodiment is that the part of the locking lever engaging the movable member (i.e. the remainder of the locking lever) has a fixed position in said second direction, which may keep the complexity of the open roof construction, especially where the locking lever is connected to the movable member, to a minimum.

The flexibility of said part of the locking lever may be obtained in different ways, for example through hinge provisions or through the use of specific materials.

In a further embodiment the locking mechanism according to an aspect of the present invention is provided with a locking device for preventing a movement of the locking lever in said second direction once the first cam has entered the second guide part of the first guide. Such locking device prevents the first cam from unintentionally leaving the second guide part of the first guide in the stationary part (especially when the operating part has moved to a position in which it does no longer engage the locking lever).

In one embodiment, then, the locking device is a spring member preloaded to its locking position and engageable by the operating part for a movement to its unlocked position. In such an embodiment the operating part also serves for operating the spring member. When the operating part engages the spring member, the latter is moved to its unlocked position and the first cam of the locking lever is capable of moving into and out of the second guide part. When the first cam has entered the second guide part and the operating part disengages the spring member, the latter moves towards its locking position in which the locking lever remains locked.

The movement of the locking device between its locking and unlocked position may occur in a third direction substantially perpendicular to the second direction. As a result the load of the locking device or spring member does not contribute to the movement of the locking lever but only is capable of preventing such movement. As a result the movement of the locking lever may be controlled in an optimal manner and disturbing noises resulting from the movement of the locking lever (especially when the first cam enters the second guide part) may be minimised.

It is possible that the spring member is provided on the locking lever and in its locking position engages the stationary part. Further it is advantageous in such a case that the spring member is located in such a position that it is not accessible from the top of the locking mechanism, and preferably not from the outside of the locking mechanism. This effectively prevents the spring member from being operated (unlocked) unintentionally (for example while servicing or cleaning the open roof construction).

In a still further embodiment of the locking mechanism the first and second guides are defined in inserts positionable in the stationary part and operating part, respectively. This allows an easy fine tuning of the guides for obtaining exactly the desired movement of the locking lever. Such a feature is used in an optimal manner when the inserts are made of plastic material.

In a another aspect the present invention relates to an open roof construction for a vehicle, provided with a locking mechanism.

Such an open roof construction in one embodiment comprises a roof opening provided in a stationary roof part of the vehicle and a movable panel for opening and closing said roof opening, wherein the locking lever is connected to a mechanism for lifting the movable panel. As a result the mechanism for lifting the movable panel may be locked in a position in which the movable panel is lifted to a predetermined position. When, in such an embodiment, the operating part engages the movable panel for imparting thereto a sliding movement substantially in parallel to the first direction, the operating part firstly causes the locking lever to move the mechanism (and thus the movable panel) to the lifted position, secondly causes the locking lever to achieve its locked position (in which the mechanism remains in the lifted position) and thirdly causes the movable panel to slide while in the lifted position.

It is noted that, although above an embodiment has been described in which the locking system is used to lock the lifting movement of a movable panel of an open roof construction, such a locking mechanism also may be used for locking the movement of or between other parts of an open roof construction, for example between multiple panels, between a blind system and a wind deflector or between a glass panel and a wind deflector.

BRIEF DESCRIPTION OF THE DRAWINGS

Hereinafter aspects of the invention will be elucidated while referring to the drawings, in which.

DETAILED DESCRIPTION OF THE ILLUSTRATIVE EMBODIMENTS

It is noted that definitions of orientations and directions in the following description relate to the normal operative state of the mechanism (for example, if used in a vehicle, when the vehicle is in a normal upright position with its wheels resting on the ground).

Figure 6:
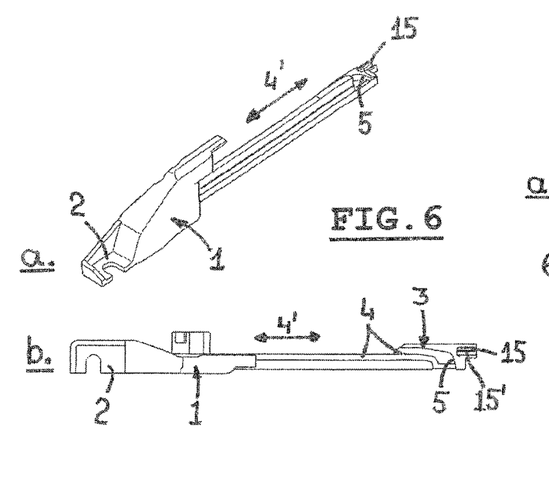
FIGS. 6-9 show constitutive parts of the above embodiment of the locking mechanism.
Figure 11:
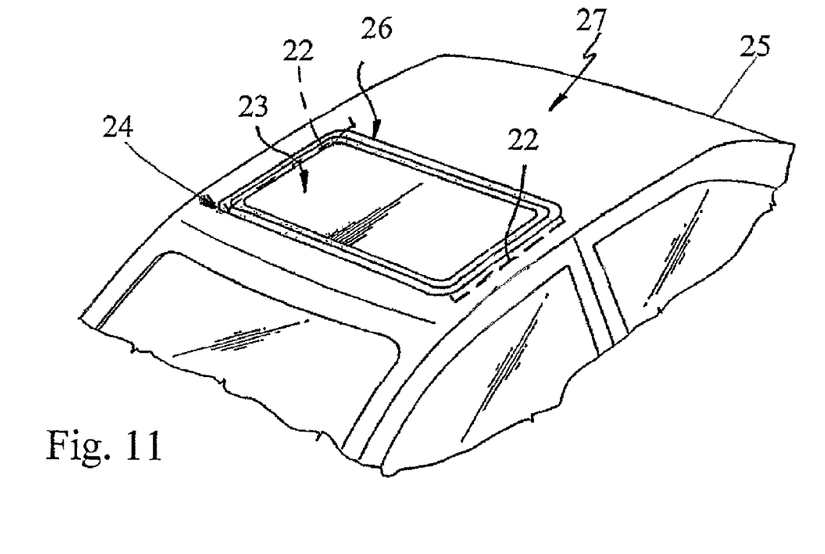
FIG. 11 shows a schematic perspective view of a vehicle roof.

Firstly referring to FIG. 6 (of which FIG. 6a illustrates a perspective view and FIG. 6b illustrates a top plan view) the illustrated embodiment of a locking mechanism 22 for a movable member 23 of a roof assembly 24 of an open roof construction for a vehicle 25 (such as illustrated in FIG. 11), for example, a movable panel 23 for opening and closing a roof opening 26 comprises a stationary part 1 (for example attacked to a fixed roof part 27 of the vehicle 25 through a mounting element 2 (e.g. mounting flange having an aperture for a fastener). This stationary part 1 is provided with a first guide 3 which comprises a first guide part 4 extending in a direction substantially in parallel to a first direction of movement 4' of a locking lever to be described later and a second guide part 5 connecting to said first guide part 4 in substantially a second direction.

Figure 7:
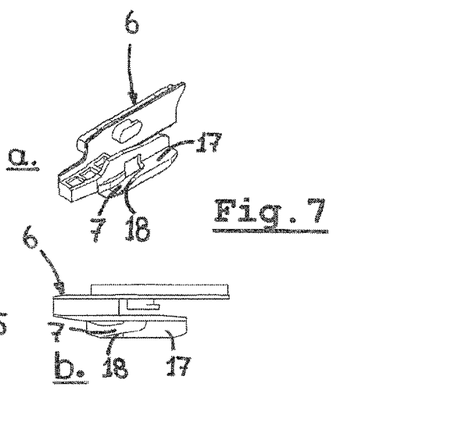

As illustrated in FIG. 7 (of which FIG. 7a illustrates a perspective view and FIG. 7b illustrates a top plan view) the locking mechanism 22 further comprises an operating part 6 which is movable in said first direction 4' for controlling the movement of the locking lever. The movement of the operating part 6 may occur through means known per se, for example via a cable operably connected to a drive motor, crank or the like(not illustrated) and may be guided by a guide (not illustrated either). The operating part 6 comprises a second guide 7 extending in a curved manner.

The locking mechanism 22 also comprises a locking lever 8 (see FIG. 8) which is movable in said first direction for driving said movable member and for locking it in a predetermined position. As will appear later, the movement of the locking lever 8 is controlled by the operating part 6.

The locking lever 8 comprises a first cam 9 provided to cooperate with the first guide 3 of the stationary part 1 in a manner to finally lock the locking lever 8 for preventing a further movement thereof in said first direction 4'. This will be elucidated later.

The locking lever 8 further comprises a second cam 10 provided to cooperate with the second guide 7 of the operating part 6. As will appear later, said second guide 7 is capable of generating a force on the locking lever 8 in/opposite the second direction when the operating part 6 is moved in a first/second sense along said first direction 4', such that the first cam 9 can move into/out of the second guide part 5 of the first guide 3 in said second direction while the second cam 10 moves out of/into the second guide 7 of the operating part 6.

As illustrated best in FIG. 6b the second guide part 5 near to its end remote from the first guide part 4 extends in a direction (the second direction) which substantially is perpendicular to the first direction 4'. Moreover, in the shown embodiment said second direction extends substantially in a horizontal plane.

The first and second cams 9,10 are provided on a flexible part of the locking lever 8 for allowing their movement in said second direction. For example a forward locking lever part 11 may be connected to a rearward locking lever part 12 in a joining region 13 which may define a hinge (alternatively the forward locking lever part 11 may comprise a flexible material). Preferably the remainder of the locking lever 8 (such as, in the above example, the rearward locking lever part 12) is designed to move in said first direction 4' only.

Figures 8, 9, 10:
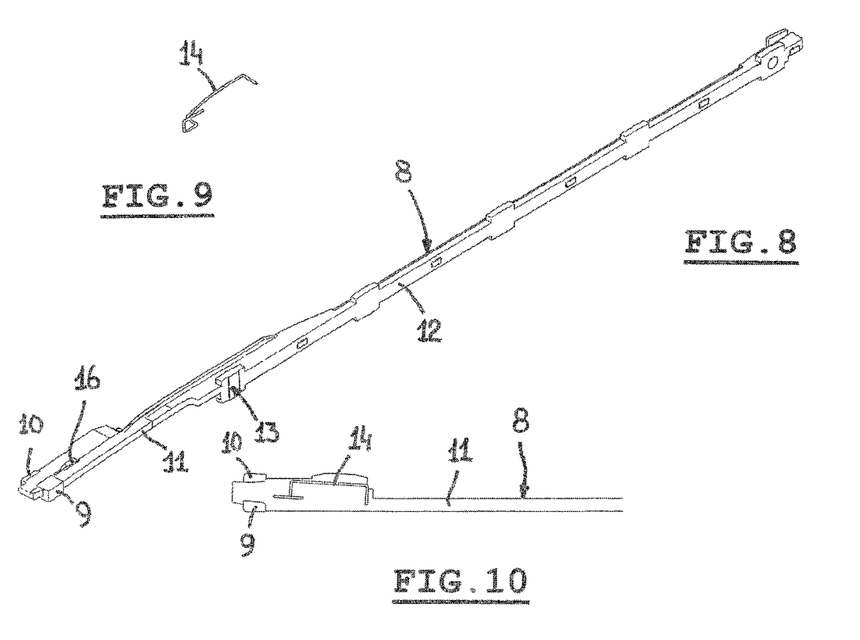
FIG. 10 shows in a top plan view two of the above constitutive parts, i.e. the spring member and locking lever, in an assembled position.

FIG. 9 illustrates a locking spring member 14 which is provided for preventing a movement of the locking lever 8 in said second direction 4' once the first cam 9 has entered the second guide part 5 of the first guide 3. This spring member 14 is preloaded to its locking position and, in a manner to be described later, is engageable by the operating part 6 for a movement to its unlocked position.

As illustrated in FIG. 10 (showing a top plan view of the forward part 11 of the locking lever 8) the spring member 14 is provided on the locking lever. In its locking position the spring member will engage a locking tab 15 (see FIG. 6) of the stationary part 1. The locking lever 8 comprises an opening 16 (partly visible in FIG. 8) through which the spring member 14 may extend for engaging the locking tab 15.

Referring to FIG. 7 the operating part 6 comprises a spring drive part 17 with ramp 18. This ramp 18 in a manner to be described later allows the spring drive part 17 of the operating part 6 to engage the spring member 14 in a manner to move it between its operative and inoperative positions.

The spring member 14 generally will be located in such a position that it is not accessible from the top of the locking mechanism 22, and preferably not from the outside of the locking mechanism 22. This prevents an unintended use.

In the illustrated embodiment the movement of the spring member 14 between its locking and unlocked positions occurs in a third direction substantially perpendicular to the second direction. In this embodiment this will be a vertical direction.

Although not illustrated in detail, the first and second guides 3,7 may be defined in inserts positionable in the stationary part 1 and operating part 6, respectively, which may be made of plastic material.

One specific application of the locking mechanism 22 is the roof assembly 24 of the open roof construction for the vehicle 25. As is known per se, such an open roof construction may comprise the roof opening 26 provided in a stationary roof part 27 of the vehicle 25 and the roof assembly 24 having the movable panel 23 for opening and closing said roof opening 26. In FIGS. 1-5 a guide or curve 19 is shown which forms part of or is connected to the movable panel 23. The locking lever 8, in this embodiment, is connected to a lifting mechanism 20 for lifting said guide 19 of the movable panel near to its rearward edge.

It is noted further that the operating part 6 in a manner known per se (e.g. via link(s), lever(s), cable(s) etc.) and not necessary for understanding the aspects of the invention and thus not elucidated here may engage the movable panel 23 (or guide 19) for imparting thereto a sliding movement substantially in parallel to the first direction 4'. As such the operating part 6 at one hand controls the movement of the locking lever 8 (and thus lifting of the movable panel or guide 19) and at the other hand controls said sliding movement.

Next the operation of the locking mechanism 22 will be explained while referring to FIGS. 1-5 which, in their respective views, illustrate different stages of the operation. In the respective figures view a. shows a perspective view from below, view b. shows a perspective view from above, view c. shows a top plan view of a forward part of the mechanism and, where applicable, view d. shows a side view of a forward part of the mechanism.

Figure 1:
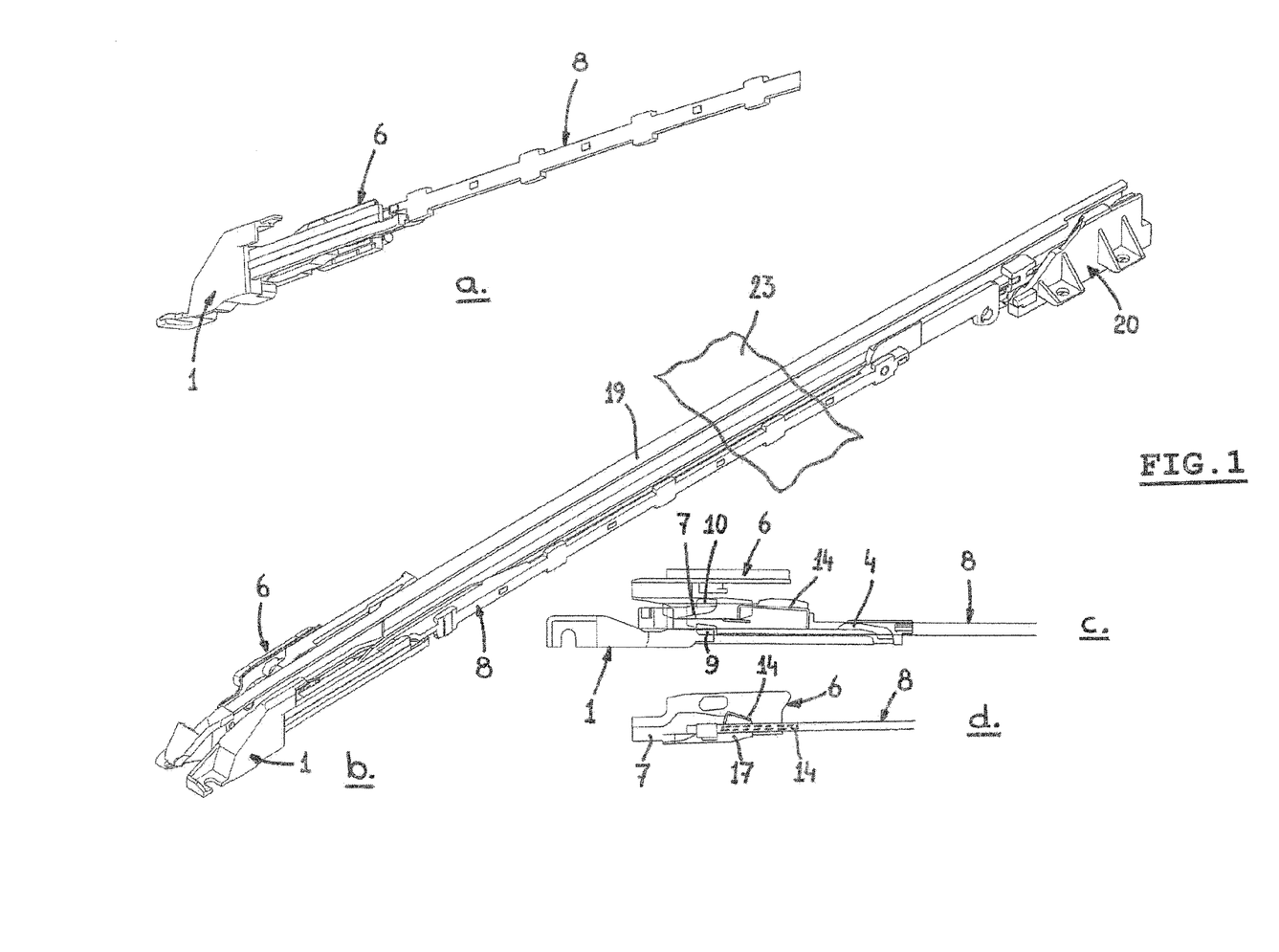
FIGS. 1-5 show an embodiment of a locking mechanism during different stages of its operation, wherein each figure illustrates a number of different views of the mechanism.

In FIG. 1 the locking mechanism 22 is illustrated in a position in which the locking lever 8 is in its most forward position in which the lifting mechanism 20 keeps the guide 19 in its lowermost position. This can correspond to the closed position of the moveable panel 23. The first cam 9 is positioned in first guide part 4 of the stationary part 1 (or on a forward prolongation thereof and not yet really within said first guide part). The second cam 10 is located in the second guide 7 of the operating part 6. Latter with its spring drive part 17 engages spring member 14 for lifting it to the unlocked position illustrated best in FIG. 1*d*.

It is noted that the roof assembly 21 may comprise further guides for guiding movements of the locking mechanism 22 or components of the locking mechanism 22, depending on desired movements of the panel 23. However, such further guides do not have a function which is essential for understanding the operation of the locking mechanism 22 and thus have not been illustrated nor described.

Figure 2:
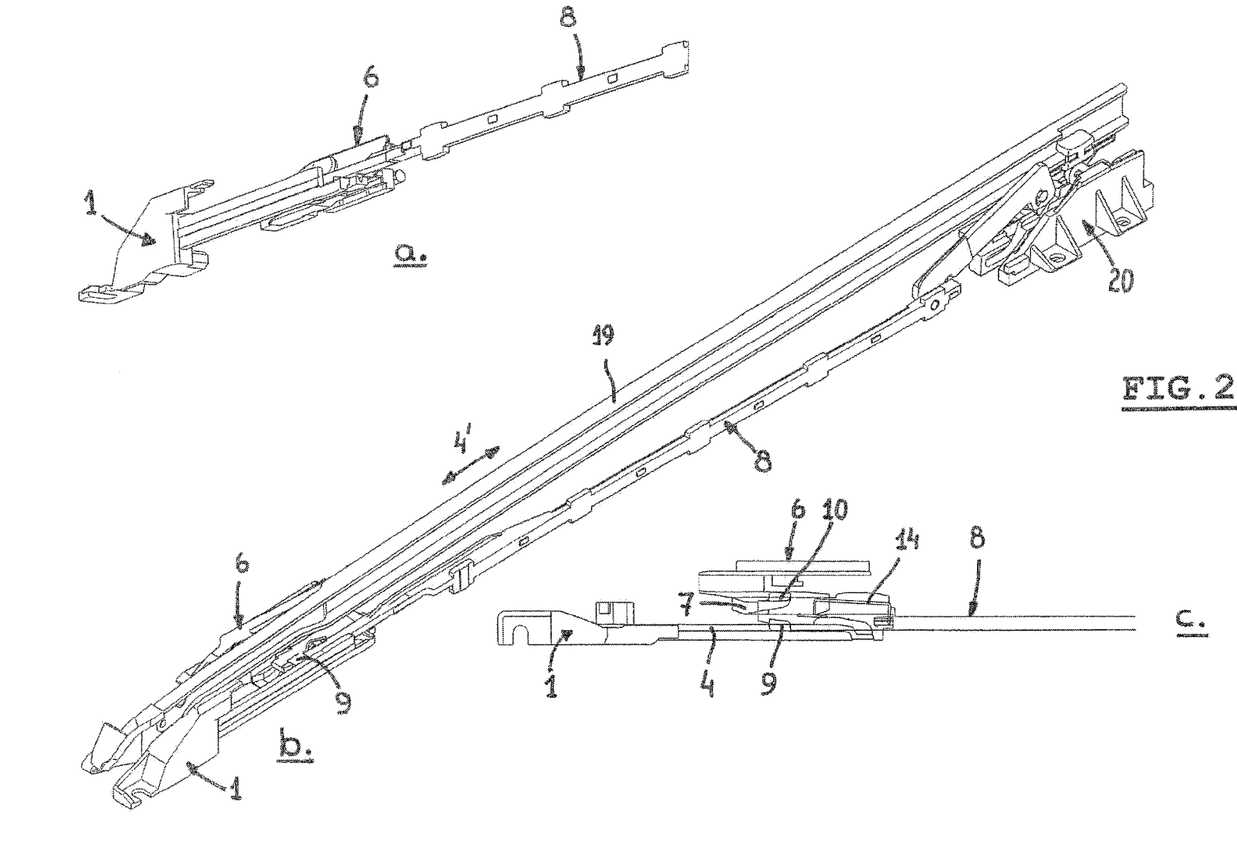

In FIG. 2 the operating part has started to move backwards in parallel to the first direction 4' (in FIG. 2*c* to the right) and the locking lever 8 moves along therewith while activating the lifting mechanism 20 (the guide 19 already has been lifted slightly). The driving force of the operating part 6 is transmitted to the locking lever 8 by the second guide 7 which engages the second cam 10. As illustrated best in FIG. 7*b*, the second guide 7 has a curved shape as a result of which a force will be generated striving to move the second cam 10 in a transverse direction. When the second cam 10 is in the innermost part of the second guide 7 (in FIG. 7*b* top right), a movement of said second cam out of said part would also lead to a transverse movement of the second cam 10 (in FIG. 7*b* downward). However, as long as the first cam 9 is located in the first guide part 4 of the first guide 3 (as illustrated for example in FIG. 2*c*) such a transverse movement is not possible and the locking lever 8 will move along with the operating part 6.

The spring member 14 still is in its lifted, inoperative (unlocked) position.

Figure 3:
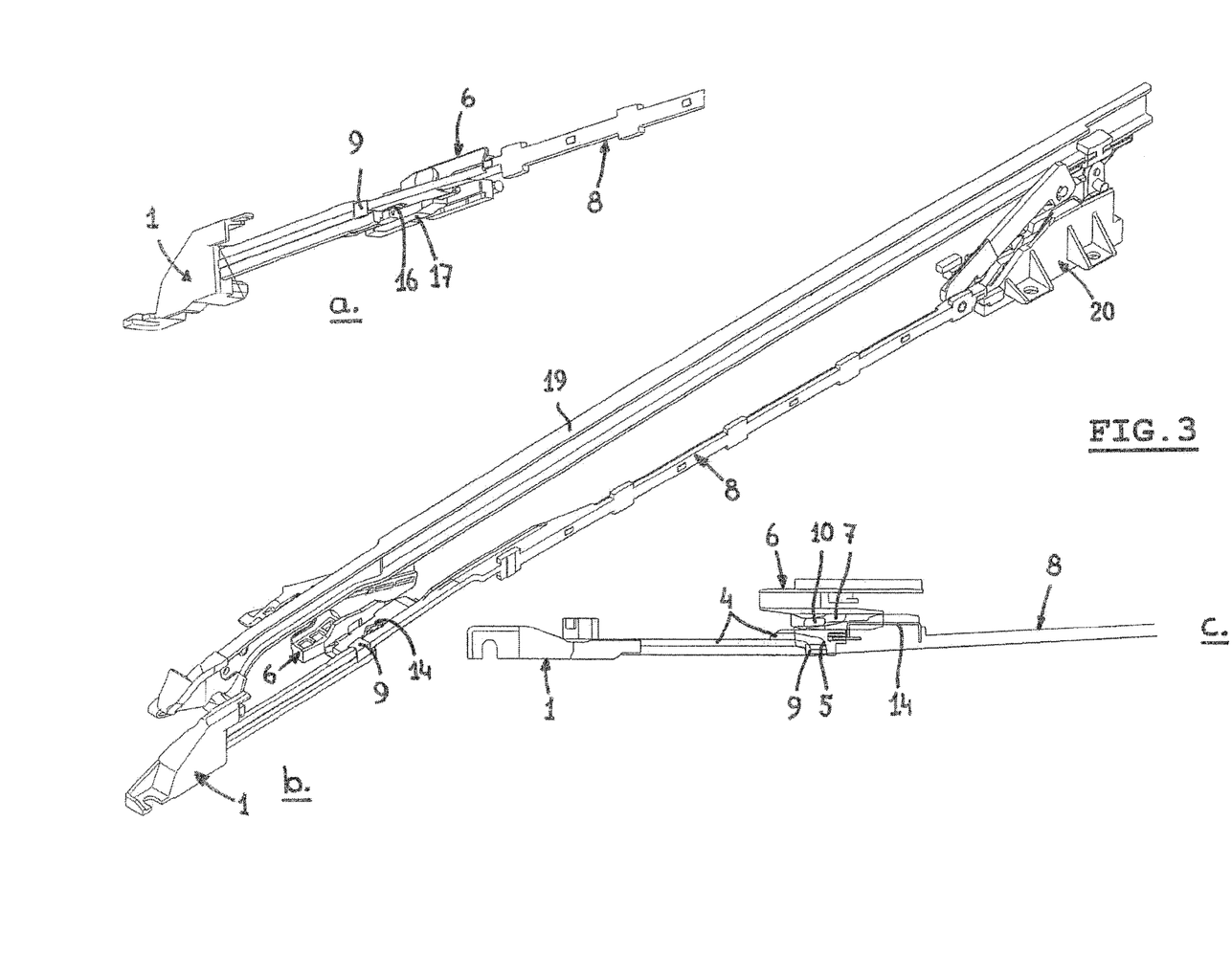
Figure 4:
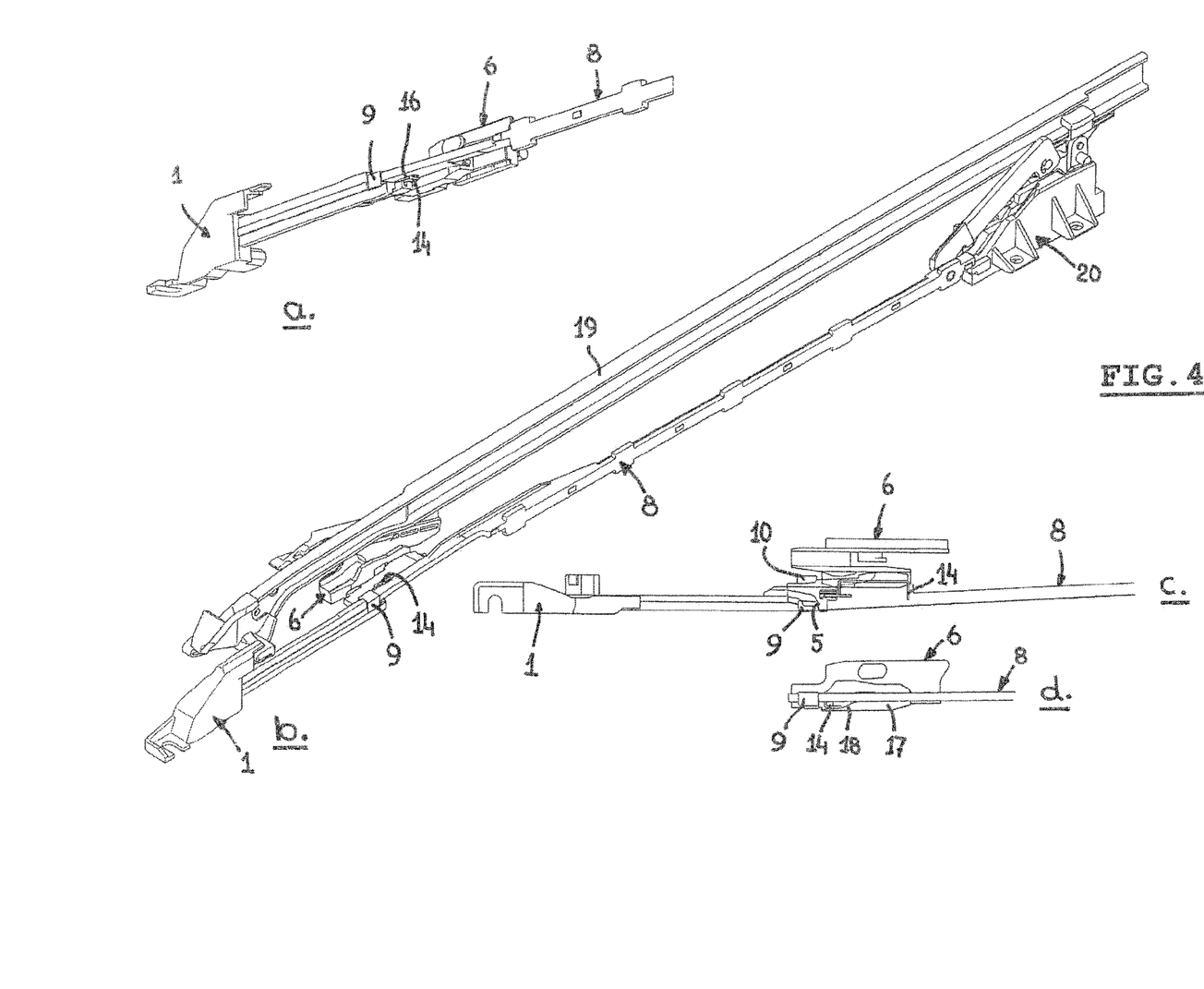

In FIG. 3 the operating part 6 has moved still further, moving along the locking lever 8. The first cam 9 of the locking lever has been moved in the second guide part 5 of the first guide 3 (aided by the force generated by the curved second guide 7 which acts on the second cam 10). This movement has caused the forward part of the locking lever 8 to also move in a sideward direction. The spring drive part 17 of the operating part 6 still engages the spring member 14 which therefore does not yet protrude through opening 16 in the locking lever 8 (see FIG. 3*a*). The locking lever 8 has now assumed its extreme position (which also holds true for the lifting mechanism 20).

A further movement of the operating part 6 is not followed by the locking lever 8 because the first cam 9 is in the second guide part 5 and as a result the second cam 10 can and will move out of the second guide 7. The spring drive part 17 will disengage the spring member 14 which will protrude downward through opening 16 for engaging a slot 15' of locking tab 15 on the stationary part 1 (see FIG. 6*b*). As a result the locking lever is now safely locked in its position.

Figure 5:
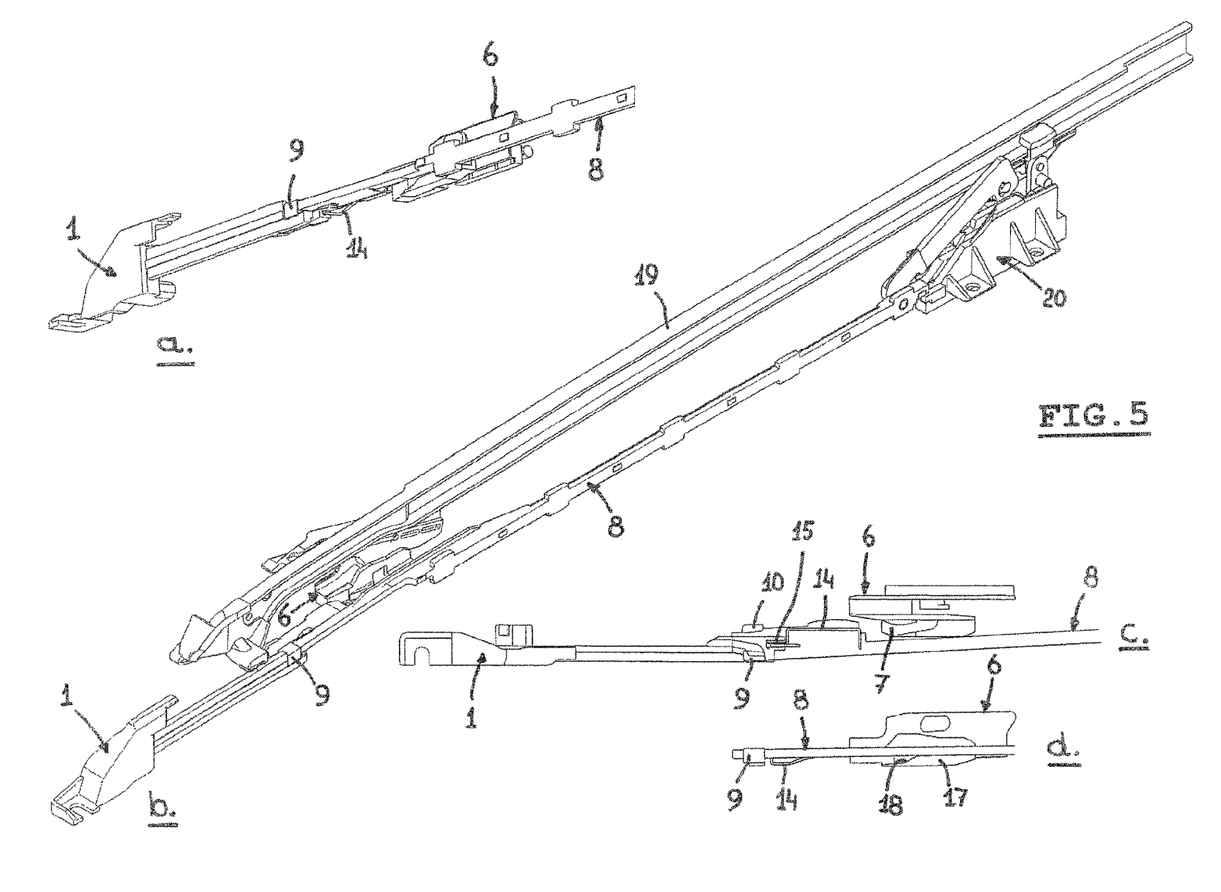

Finally FIG. 5 illustrates a position in which the operating part has moved completely free from the locking lever 8.

During the foregoing stages the operating part 6 also has moved the guide 19 backwards and it will keep doing so until the guide 19 has reached an extreme position (for example a position in which the movable panel 23 connected to the guide 19 has completely freed a roof opening).

The spring member 14 securely holds the locking lever 8 in the locked position, however without itself being subjected to loads acting on the locking lever in the first direction 4' (such as the weight of a movable panel). Because the spring member does not control the movement of the first cam 9 in and out of the second guide part 5, this movement may be achieved in a very controlled manner (and without creating disturbing noises).

When, starting from the position illustrated in FIG. 5, the operating part 6 is again moved forward, the ramp 18 of spring drive part 17 first will engage spring member 14 (FIG. 4) for lifting and disengaging it from locking tab 15. Next the second cam 10 is captured within and will enter second guide 7 (FIG. 3) and will be displaced in a sideward direction. This leads to a corresponding sideward movement of the first cam 9 out of second guide part 5 and into first guide part 4. Finally the locking lever 8 will move forward to its original position (FIG. 1).

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

The invention claimed is:

1. A locking mechanism for a movable member of an open roof construction for a vehicle, comprising:
   a stationary part which is provided with a first guide,
   a locking lever movable in a first direction configured to drive said movable member and to lock the movable member in a predetermined position, and
   an operating part movable in said first direction configured to control the movement of the locking lever, wherein the locking lever comprises a first cam cooperating with the first guide, which first guide comprises a first guide part extending in a direction substantially in parallel to said first direction of movement of the locking lever and a second guide part connecting to said first guide part in a second direction and configured to receive the first cam of the locking lever for preventing a further movement of the locking lever in said first direction, wherein the operating part is configured to generate a force on the locking lever in/opposite the second direction when the operating part is moved in a first/second sense along said first direction, such that the first cam moves into/out of the second guide part of the first guide in said second direction;
   wherein the locking lever comprises a second cam cooperating with a second guide provided in the operating part, which second guide is configured to generate said force on the locking lever in/opposite the second direction when the operating part is moved in a first/second sense along said first direction, such that the first cam moves into/out of the second guide part of the first guide in said second direction while the second cam moves out of/into the second guide of the operating part, allowing the operating part to move fully free from the locking lever.

2. The locking mechanism according to claim 1, wherein the second direction is perpendicular to the first direction.

3. The locking mechanism according to claim 1, wherein the first and second cams are provided on a flexible part of the locking lever for allowing a movement in said second direction, whereas the remainder of the locking lever is designed to move in said first direction only.

4. The locking mechanism according to claim 1, further comprising a locking device configured to prevent a movement of the locking lever in said second direction once the first cam has entered the second guide part of the first guide.

5. The locking mechanism according to claim 4, wherein the movement of the locking device between its locking and unlocked position occurs in a third direction substantially perpendicular to the second direction.

6. The locking mechanism according to claim 4, wherein the locking device is a spring member preloaded to its locking position and engageable by the operating part for a movement to its unlocked position.

7. The locking mechanism according to claim 6, wherein the spring member is provided on the locking lever and in its locking position engages the stationary part.

8. An open roof construction for a vehicle, provided with a locking mechanism comprising a stationary part secured to a fixed roof part which is provided with a first guide, a locking lever movable in a first direction for driving a movable member and for locking the movable member in a predetermined position and an operating part movable in said first direction for controlling the movement of the locking lever, wherein the locking lever comprises a first cam cooperating with the first guide, which first guide comprises a first guide part extending in a direction substantially in parallel to said first direction of movement of the locking lever and a second guide part connecting to said first guide part in a second direction and configured to receive the first cam of the locking lever for preventing a further movement of the locking lever in said first direction, wherein the operating part is configured to generate a force on the locking lever in/opposite the second direction when the operating part is moved in a first/second sense along said first direction, such that the first cam moves into/out of the second guide part of the first guide in said second direction; wherein the locking lever further comprises a second cam cooperating with a second guide provided in the operating part, which second guide is configured to generate said force on the locking lever in/opposite the second direction when the operating part is moved in a first/second sense along said first direction, such that the first cam moves into/out of the second guide part of the first guide in said second direction while the second cam moves out of/into the second guide of the operating part, allowing the operating part to move fully free from the locking lever.

9. The open roof construction according to claim 8, comprising a roof opening provided in a stationary roof part of the vehicle and a movable panel for opening and closing said roof opening, wherein the locking lever is operably connected to the movable panel to lift the panel.

10. The open roof construction according to claim 9, wherein the operating part engages the movable panel for imparting thereto a sliding movement substantially in parallel to the first direction.

11. A roof assembly comprising:
    a panel; and
    a locking mechanism having a guide connected to the panel, the locking mechanism comprising:
      a part which is provided with a first guide,
      a locking lever movable in a first direction configured to move the carve guide and to lock the guide in a predetermined position, and
      an operating part movable in said first direction configured to control movement of the locking lever, wherein the locking lever comprises a first cam cooperating with the first guide, which first guide comprises a first guide part extending in a direction substantially in parallel to said first direction of movement of the locking lever and a second guide part connecting to said first guide part in a second direction and configured to receive the first cam of the locking lever to prevent further movement of the locking lever in said first direction, wherein the operating part is configured to generate a force on the locking lever in/opposite the second direction when the operating part is moved in a first/second sense along said first direction, such that the first cam moves into/out of the second guide part of the first guide in said second direction; wherein the locking lever further comprises a second cam cooperating with a second guide provided in the operating part, which second guide is configured to generate said force on the locking lever in/opposite the second direction when the operating part is moved in a first/second sense along said first direction, such that the first cam moves into/out of the second guide part of the first guide in said second direction while the second cam moves out of/into the second guide of the operating part, allowing the operating part to move fully free from the locking lever.

12. The locking mechanism according to claim 11, wherein the second direction is perpendicular to the first direction.

13. The locking mechanism according to claim 11, wherein the second direction extends substantially in a horizontal plane.

14. The locking mechanism according to claim 11, wherein the first and second cams are provided on a flexible part of the locking lever for allowing a movement in said second direction, whereas the remainder of the locking lever is designed to move in said first direction only.

15. The locking mechanism according to claim 11, further comprising a locking device configured to prevent a movement of the locking lever in said second direction once the first cam has entered the second guide part of the first guide.

16. The locking mechanism according to claim 15, wherein the movement of the locking device between its locking and unlocked position occurs in a third direction substantially perpendicular to the second direction.

17. The locking mechanism according to claim 15, wherein the locking device is a spring member preloaded to its locking position and engageable by the operating part for a movement to its unlocked position.

18. The locking mechanism according to claim 17, wherein the spring member is provided on the locking lever and in its locking position engages the part.

19. The locking mechanism according to claim 17, wherein the spring member is located in such a position that it is not accessible from the top of the locking mechanism.

20. The locking mechanism according to claim 1, wherein the second direction extends substantially in a horizontal plane.

* * * * *